United States Patent [19]

Graefe

[11] Patent Number: 5,002,475
[45] Date of Patent: Mar. 26, 1991

[54] REACTION INJECTION MOLDING APPARATUS

[75] Inventor: Peter U. Graefe, Wayside, N.J.

[73] Assignee: Intellex Corporation, Uniondale, N.Y.

[21] Appl. No.: 434,410

[22] Filed: Nov. 9, 1989

Related U.S. Application Data

[62] Division of Ser. No. 253,224, Oct. 4, 1988.

[51] Int. Cl.⁵ .................. B29C 45/34; B29C 45/76
[52] U.S. Cl. ................... 425/135; 425/149; 425/586; 425/590; 425/812
[58] Field of Search .......... 425/135, 149, 812, 542, 425/543, 555, 586, 590; 73/54, 32 A, 59; 264/40.1, 40.3

[56] References Cited

U.S. PATENT DOCUMENTS

| | | | |
|---|---|---|---|
| 2,347,320 | 4/1944 | Hiltner | 264/516 |
| 2,687,555 | 8/1954 | Anspon et al. | 264/313 |
| 2,867,003 | 1/1959 | Stiles | 249/82 |
| 3,632,729 | 1/1972 | Bielfeldt | 264/294 |
| 3,642,974 | 2/1972 | Jacobi et al. | 264/294 |
| 3,807,914 | 4/1974 | Paulson et al. | 425/144 |
| 3,825,386 | 7/1974 | Bello et al. | 425/135 |
| 3,840,312 | 10/1974 | Paulson et al. | 425/149 |
| 3,853,446 | 12/1974 | Hostettler et al. | 425/217 |
| 3,893,792 | 7/1975 | Laczko | 425/149 |
| 3,903,732 | 9/1975 | Rork et al. | 73/54 |
| 3,917,792 | 11/1975 | Conacher, Jr. | 264/378.6 |
| 3,932,083 | 1/1976 | Boettner | 425/145 |
| 3,935,053 | 1/1976 | Armstrong | 425/135 |
| 4,117,716 | 10/1978 | Simon | 73/32 A |
| 4,120,631 | 10/1978 | Leutner et al. | 425/149 |
| 4,208,176 | 6/1980 | Salerno | 425/139 |
| 4,252,760 | 2/1981 | Foster et al. | 264/120 |
| 4,373,092 | 2/1983 | Zsolnay | 528/481 |
| 4,473,215 | 9/1984 | Rathfon, II et al. | 264/40.5 |
| 4,534,003 | 8/1985 | Manzione | 425/542 |
| 4,552,012 | 11/1985 | Bohlin | 73/59 |
| 4,594,883 | 6/1986 | Pollard | 73/54 |
| 4,613,110 | 9/1986 | Rose | 425/812 |
| 4,644,781 | 2/1987 | Mon | 73/55 |
| 4,657,871 | 4/1987 | Freakley et al. | 436/59 |
| 4,692,291 | 9/1987 | Angell, Jr. | 264/109 |
| 4,720,364 | 1/1988 | Kauffman et al. | 264/40.5 |
| 4,754,640 | 7/1988 | Fitzgerald et al. | 73/54 |
| 4,758,803 | 7/1988 | Thomas | 264/40.1 |
| 4,779,452 | 10/1988 | Cohen-Tenoudji et al. | 73/54 |
| 4,810,438 | 3/1989 | Webster et al. | 264/40.6 |
| 4,921,415 | 5/1990 | Thomas et al. | 425/149 |

FOREIGN PATENT DOCUMENTS 0024610 8/1980 European Pat. Off. .
3522377 1/1987 Fed. Rep. of Germany .

OTHER PUBLICATIONS

Ruhmann et al., "Aspekte zur Konstruktion von RIM-Anlagen der Zukunft", Kunstoffe, Carl Hanser Verlag, Munich, Germany (1987).

Boden et al., "New Possibilities of Improving the RIM Process by Utilizing Externally Applied Holding Pressure", *Polyurethane World Congress* 1987 (9/29/87–10/2/87).

"Why Horizontal RIM Looks Hot", *Plastics Technology*, pp. 31 et seq. (May, 1988).

Primary Examiner—Willard E. Hoag
Attorney, Agent, or Firm—Rocco S. Barrese; Peter G. Dilworth

[57] ABSTRACT

In an apparatus for the reaction injection molding of a shaped article from a polymerizable flowable resin-forming composition, once such composition has attained a predetermined increased level of viscosity as measured in situ within the mold cavity, an amount of pressure is applied to the polymerizing composition which is sufficient to maintain any entrapped gas(es) dissolved therein and/or to prevent the composition from pulling away from mold cavity surfaces.

10 Claims, 4 Drawing Sheets

REACTION INJECTION MOLDING APPARATUS

This is a continuation of co-pending application Ser. No. 07/253,224 filed on Oct. 4, 1988.

BACKGROUND OF THE INVENTION

This invention relates to the manufacture of shaped articles from flowable polymerizable resin-forming compositions employing reaction injection molding apparatus and techniques.

Molding resins are broadly classified as thermoplastic or thermosetting and molding apparatus and techniques vary considerably according to which of these two categories of materials is being processed. Thermoplastic molding resins, for example, polyolefins, polyvinyls, polyamides, polycarbonates, polystyrenes, etc., are, when heated to the plastic state, highly viscous fluids, e.g., they possess viscosities of from about 10,000 to about 50,000 centipoises or more, and injection pressures of a considerable magnitude, e.g., from about 500 to about 5,000 p.s.i.a., and in some cases even higher, are required to completely fill the mold cavity and expel the bulk of any air and/or other gas from the mold cavity through vents provided for this purpose, generally small grooves in the parting line of the mold extending from the lip of the mold cavity to its outer edge. The gas, being far less viscous than the thermoplastic, is readily displaced from the mold cavity under the influence of the high injection pressures whereas the thermoplastic is fully retained in the mold cavity. The high injection pressures which are typical of thermoplastic injection molding operations also serve to maintain the small quantities of gas which are inevitably present in the molding resins in solution thereby preventing the formation of bubbles or voids in the molded product.

Reaction injection molding (RIM) apparatus and processes have been gaining increasingly wider acceptance for manufacturing shaped articles from thermosetting resins, largely because of the low injection pressures and shorter molding cycles of these resins compared to those for thermoplastic resins but also due to the fact that the excellent physical and chemical properties of many thermosetting resins, e.g., polyurethane elastomers, make them attractive candidates for numerous engineering applications such as automotive body panels and bumpers, vibration dampeners, gaskets, power transmission belts, conveyor belts, and the like.

A typical flowable polyurethane resin-forming composition is prepared by the high-speed mixing of an isocyanate-reactive liquid polymer such as a polyether or polyester glycol, triol or tetrol, amine-terminated polyether, hydroxyl-terminated polybutadiene, etc., and mixtures thereof, an organic polyisocyanate, a chain extender, and, optionally, one or more other components such as catalyst, filler, colorants, etc., to provide a homogeneous liquid of relatively low viscosity, e.g., from about 50 to about 10,000 centipoises, and preferably from about 500 to about 5,000 centipoises. The composition is then injected into the cavity of a mold, which may or may not be heated, in as brief a time following mixing of the aforesaid components as possible in order to prevent any significant degree of gelation from taking place before the full amount of reaction medium required has been introduced into the mold cavity. Injection pressures are generally quite low, usually from about 2 to about 120 p.s.i.a., since appreciably higher pressures would only force low viscosity reaction medium through the mold vents. For a more detailed discussion of reaction injection molding apparatus and processes, reference may be made to Lloyd et al., "Polyurethane RIM: A competitive Plastics Molding Process", *ACS Symposium Series* 270 and W. E. Becker, eds., "Reaction Injection Molding", Van Nostrand Reinhold Co., New York, 1979.

In practice, it is just about impossible to exclude air or other gas from liquid thermosetting resins due to the chemistry of the polymerization process (gelation followed by curing). Taking the specific case of polyurethane elastomer-forming compositions, there are several sources of gas all of which can, and do, prove troublesome in the molding process. All polyurethane reaction media must contain a polyisocyanate component. Polyisocyanates are very reactive toward substances containing active hydrogen which, of course, includes water. In the manufacture of polyurethane foams, it is the reaction of polyisocyanate with water which, in a train of chemical events, results in the evolution of carbon dioxide gas. The foaming, or blowing, activity of carbon dioxide may or may not be supplemented by an auxiliary blowing agent such as a low boiling halogenated hydrocarbon. In contrast to polyurethane foam reaction media, polyurethane elastomer-forming compositions must scrupulously exclude water and water vapor in order to avoid the generation of carbon dioxide gas. When the elastomer is polyester polyol based, it is practically impossible to completely remove all traces of water resulting from the manufacture of the polyester. Another source of gas in polyurethane reaction media is the nitrogen blanket which is employed for the purpose of preventing contact of each reaction component with atmospheric water vapor during storage. While very little of the gas remains after the reaction components have been passed through a degasser, there may still be enough nitrogen present to significantly contribute to the overall problem of gas entrapment during molding. Still another source of gas results from the manner in which the polyurethane reaction media are injected into the mold. During the injection cycle, air is unavoidably introduced into the reaction media stream. Moreover, any turbulence or "splashing" effect accompanying the filling of the mold cavity can introduce further quantities of air into the reaction media.

The presence of gas bubbles or voids in a molded polymeric article is highly undesirable for several reasons. Those present at the surface of the article detract from its appearance, a defect which is often sufficient of itself to result in failure of the article to meet minimum quality standards. Those within the interior of the article can significantly diminish its physical and mechanical properties limiting not only the ability of the article to perform as well as desired but reducing its useful service life as well. For example, in the case of a polyurethane elastomer article which experiences frequent compression-decompression cycles, e.g., a vibration dampening device based on this resin, the "dieseling" effect which can occur within bubbles of entrapped gas can cause localized hot spots within the article which accelerate its failure.

Design and process variables in a reaction injection molding system can be controlled to some extent to reduce the amount of air and/or other gas entrapped within liquid resin-forming media. However, since the viscosities of flowable thermosetting reaction media are generally too low to permit the use of injection pressures which would maintain entrapped gas in solution, e.g., the relatively high levels of injection pressure which are commonly used in thermoplastic molding operations, it is not possible to eliminate or suppress the problem of entrapped gas bubbles or voids in reaction injected molded products by resort to high injection pressures.

According to U.S. Pat. No. 3,853,446, the contents of which are incorporated by reference herein, a reaction injection molding apparatus is disclosed wherein a movable piston, or "bottom plate", which forms part of the mold cavity is actuated immediatelY following the injection of a liquid resin reaction medium into the cavity, i.e., before any appreciable increase in viscosity of the reaction medium (due to polymerization) has taken place. Upward movement of the bottom plate by a predetermined distance simultaneously closes the runner (the passage through which the liquid reaction medium is introduced into the mold cavity) and reduces the volume of the mold cavity to the point where the reaction medium completely fills the mold. It is to be noted that the bottom plate does not act upon a reaction medium of appreciably increased viscosity nor does it subject the reaction medium to any pressure significantly above that which is used in the filling of the mold.

While the unique means provided in U.S. Pat. No. 3,853,446 for introducing a polymerizable liquid resin-forming composition into the cavity of a reaction injection mold through the geometric center, or "point of balance", of the bottom plate can greatly reduce the turbulence within the mold during the injection cycle, this in itself may not always be enough to prevent entrapment of an excessive quantity of gas and consequent formation of an excessive number of gas bubbles or voids in the molded articles.

In addition to the problem of entrapped gas bubbles or voids, some types of liquid resin-forming reaction media, e.g., acrylics, unsaturated polyesters, and the like, are susceptible to yet another problem, namely, volume shrinkage, which occurs during their polymerization. Shrinkage causes such polymerizing reaction media to pull away from mold cavity surfaces resulting in a molded article with rough-textured surfaces.

In the so-called "cell casting" method of manufacturing transparent poly(methylmethacrylate) sheet, e.g., as described in U.S. Pat. Nos. 2,347,320, 2,687,555 and 2,867,003, wherein shrinkage in the direction of thickness on the order of about 21% is fairly typical, sufficient clamping pressure is maintained on the sealed, fluid-tight molding cell, a pair of glass plates separated by a compressible gasket, to prevent the polymerizing contents of the cell from pulling away from the plates. While this approach to compensating for in-mold volume shrinkage is quite effective, it is unsuitable for reaction injection molding operations which employ vented molds. Placing the contents of a sealed, but vented, reaction injection mold under relatively high pressure before the contents of the mold have had an opportunity to attain a level of viscosity which would prevent their being forced through the mold vents would not be a practical solution to the problem of volume shrinkage in reaction injection molding operations.

Reaction injection molding apparatus and processes in which increased pressure is applied to a polymerizing reaction injection molding composition only after the composition has reached some predetermined level of gelation are known from European Patent Application No. 24,610; German Offenleg. DE 3,522,377 Al; Ruhmann et al., "Aspekte zur Konstruktion von RIM-Anlagen der Zukunft", *Kunstoffe,* Carl Hanser Verlag, Munich, Germany (1987); Boden et al., "New Possibilities of Improving the RIM Process by Utilizing Externally Applied Holding Pressure", *Polyurethane World Congress* 1987 (Sept. 29 to Oct. 2, 1987); and, "Why Horizontal RIM Looks Hot", *Plastics Technology,* pp. 31 et seq. (May, 1988). However, in all cases, the increased pressure is applied in response to a time-programmed signal the actuation of which assumes that a certain minimum level of gelation of the polymerizing contents within the mold has been reached. Thus, for a specific liquid resin-forming composition, the viscosity build-up characteristics of the composition as a function of time under a given set of polymerization conditions are experimentally determined and the reaction injection molding apparatus is programmed accordingly to apply a predetermined level of increased pressure at a time corresponding to a desired point on the experimentally determined viscosity build-up curve. This approach to applying "after-pressure" in a reaction injection molding operation, while often effective, can lead to unacceptable results when the moment the after pressure is applied does not, in fact, correlate with the level of viscosity, or degree of gelation, assumed to have been reached. Unpredictable fluctuations in ambient temperature, mold temperature and other process variables which can be difficult to manage can render the time-programmed application of after-pressure an ineffective or unreliable technique for avoiding or minimizing the formation of entrapped gas bubbles or voids in reaction injection molding operations and/or compensating for in-mold volumetric shrinkage.

SUMMARY OF THE INVENTION

It is an object of the present invention to provide apparatus and a process for the reaction injection molding of polymeric articles from flowable polymerizable resin-forming compositions.

It is a particular object of the invention to provide a substantially bubble or void-free reaction injection molded article formed from a thermosetting resin such as a polyurethane elastomer.

It is another object of the invention to provide apparatus and a process for the reaction injection molding of shaped articles from polymerizable liquid resin-forming compositions which are susceptible to undergoing significant shrinkage during polymerization, e.g., acrylic and unsaturated polyester resin-forming compositions.

These and other objects of the invention are achieved by the reaction injection molding apparatus and process of the present invention in which the viscosity increase of the polymerizing contents of a sealed, vented mold is monitored in situ and pressure is applied to such contents when they have attained a level of viscosity which is sufficient to prevent their being forced through the mold vents, the level of applied pressure being sufficient to maintain entrapped gas dissolved within the polymerizing medium and/or to maintain the medium in intimate contact with mold cavity surfaces thereby compensating for any volumetric shrinkage which the medium might undergo during polymerization.

The reaction injection molding apparatus of the present invention comprises:

(a) a sealable mold possessing a cavity conforming to the external surfaces of the article to be molded;

(b) means for introducing a metered amount of flowable polymerizable resin-forming composition into the cavity of the sealed mold;

(c) means for venting the cavity of the sealed mold of gas displaced by resin-forming composition introduced into the cavity;

(d) viscosity measuring means associated with the mold cavity for measuring increases in the viscosity of the resin-forming composition undergoing polymerization therein; and, (e) pressure imparting means for imparting a predetermined increased amount of pressure to resin-forming composition present within the mold cavity, said pressure being applied to the composition only after it has attained a predetermined increased level of viscosity resulting from polymerization of polymerizable components therein as measured by viscosity measuring means (d).

The reaction injection molding process of the present invention comprises:

(a) introducing a metered amount of flowable polymerizable resin-forming composition into the cavity of a sealed mold possessing (i) a cavity conforming to the external surfaces of the article to be molded and (ii) means for venting the cavity of the sealed mold of gas displaced by the resin-forming composition introduced into the cavity;

(b) subjecting the polymerizable components of the resin-forming composition to polymerization conditions;

(c) measuring increases in viscosity of the resin-forming composition while it is undergoing polymerization;

(d) imparting a predetermined increased amount of pressure to resin-forming composition present in the cavity, said pressure being applied to the composition only after it has attained a predetermined minimum increased level of viscosity resulting from polymerization of polymerizable components therein as determined by measuring step (c); and, (e) maintaining at least said increased amount of pressure substantially continuously until the resin-forming composition has reached an advanced state of polymerization.

The improved reaction injection molding apparatus and process of this invention make it possible to manufacture shaped polymeric articles, including those having complex and intricate shapes, which are substantially free of gas bubbles or voids and/or which possess smooth surfaces due to their having been maintained in continuous intimate contact with the mold cavity surfaces during polymerization.

Unlike reaction injection molding apparatus and procedures such as those referred to above which rely on time-programmed application of after pressure and as such cannot take into account the effect of unpredictable fluctuations in process variables on the rate of increase in viscosity of the polymerizing contents of the mold, the reaction injection molding apparatus and process of this invention provide for the measurement of the actual viscosity of the polymerizing medium without regard to the process variables. The invention herein therefore eliminates any uncertainty as to the proper timing of the application of after pressure and provides an effective and dependable solution to the problem of entrapped gas bubbles, void formation and/or volumetric shrinkage in reaction injection molding operations.

BRIEF DESCRIPTION OF THE DRAWINGS

In the following figures of drawing where like reference numerals refer to like elements throughout.

DESCRIPTION OF THE PREFERRED EMBODIMENTS

Figure 1:
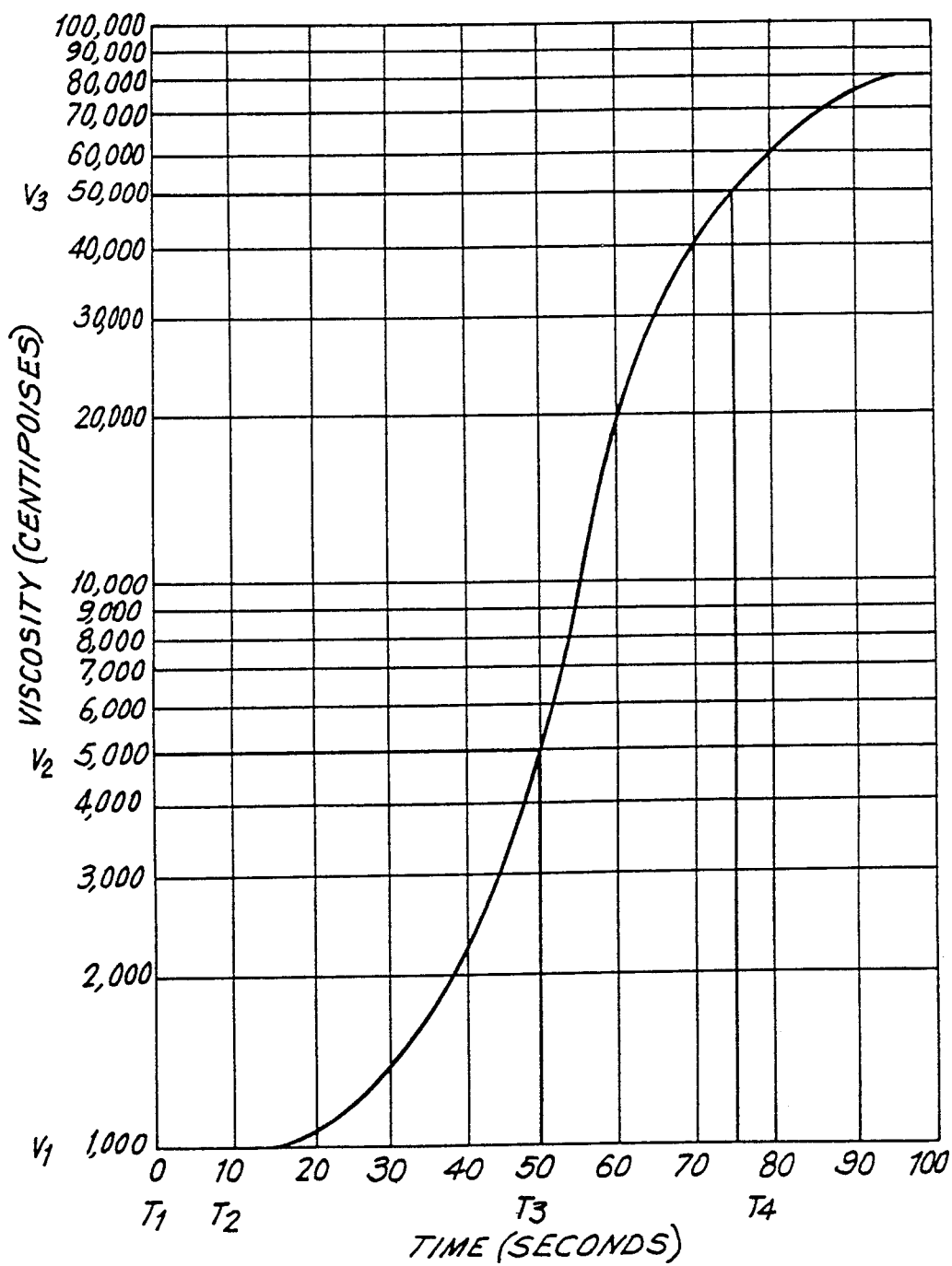
FIG. 1 is a semi-logarithmic curve representing the build-up in viscosity (ordinate, logarithmic scale) as a function of time (abscissa, linear scale) of a typical flowable thermosetting polyurethane elastomer-forming composition which can be processed into a shaped article in accordance with this invention.

The expression "reaction injection molding" shall be understood herein to refer to any molding system which involves filling a mold with a flowable polymerizable resin-forming composition, which may or may not contain a reinforcement component, the resin-forming composition then undergoing polymerization to provide an article of desired molded configuration. The expression "reaction injection molding" as used herein is therefore to be regarded as synonymous with, or inclusive of, those operations referred to as "liquid reaction molding" (LRM), "reinforced reaction injection molding" (RRIM), "liquid injection molding" (LIM) and "liquid resin molding."

The expression "flowable polymerizable resin-forming composition" shall be understood herein to refer to any such composition which, prior to undergoing a significant degree of polymerization, is a liquid, whether at ambient or elevated temperature, and which following polymerization, provides a shape-retaining resin material which may be of the thermoplastic or thermosetting category. Examples of flowable polymerizable resin-forming compositions which can be utilized in the reaction injection molding apparatus and process of this invention include those which provide polyurethanes (both thermoplastic and thermosetting), polyesters and copolyesters, alkyds, polyamides, epoxies, silicones, allyls, amino resins, vinyl resins, interpenetrating polymer networks (IPNs), etc.

In accordance with one embodiment of the invention, a measured amount of flowable polymerizable resin-forming composition, e.g., of from about 200 to about 5,000 centipoises, is introduced through a passage, or runner, into the cavity of a sealed mold the runner thereafter being sealed. The resin-forming composition is advantageously introduced into the mold cavity in as brief a time as practical in order to minimize the level of polymerization which occurs before the cavity has received the full charge. In general, injection pressures of from about 2 p.s.i.a. up to about 200 p.s.i.a., and preferably from about 10 p.s.i.a. up to about 100 p.s.i.a., can be employed. Such injection pressure will correspond to mold-fill times of a fraction of a second for relatively light charges up to about 30 seconds for the very heaviest charges. Gas displaced by the resin-forming composition is removed from the mold employing any suitable means, e.g., one or more vents which may or may not be under vacuum. Whatever the level of injection pressure used to fill the mold, it should not be so high as to force any significant quantity of liquid through the mold vents, the latter remaining open throughout the entire molding operation. After viscosity measuring means associated with the mold cavity have indicated that the resin-forming composition therein has attained a predetermined increased level of viscosity due to formation of polymer, e.g., a viscosity region within which the composition has ceased to be flowable but has not yet attained an advanced gel state (typically, from about 5,000 centipoises up to about 50,000 centipoises), pressure imparting means are actuated to increase the pressure on the mold contents to a predetermined level, generally one which is sufficient to dissolve or retain in solution air or other gas within the polymerizing medium and/or to press the polymerizing medium against the mold cavity walls in order to compensate for its tendency to pull away from the walls due to shrinkage. Increased pressure of at least this magnitude is substantially continuously maintained until the resin-forming composition has attained an advanced state of polymerization, e.g., the gel state, or if desired, the pressure can be continued right up to the curing of the composition. For many reaction injection molding resins, increased pressures on the order of from about 150 to about 4,000 p.s.i.a. are generally sufficient to achieve either or both of the aforestated goals. The pressure can be applied in a series of incremental changes corresponding to incremental changes in the viscosity of the resin-forming composition or it can be applied all at once. Following curing of the resin-forming composition, the mold is opened and the shaped article is removed therefrom.

Referring to FIG. 1, the viscosity of a typical known and conventional flowable polyurethane elastomer-forming medium increases with time, as shown in the idealized viscosity build-up curve, until the cure stage is attained. The medium is injected into the mold as a liquid, e.g., of a viscosity of from about 1,000 to about 5,000 centipoises. This viscosity region is indicated by $V_1$ to $V_2$ and the duration of the injection cycle is indicated by $T_1$ and $T_2$. Within a few seconds of being introduced into the mold cavity, ongoing polymerization of the mold contents results in an appreciable increase in the viscosity of the reaction medium. The initial period of polymerization, the gelation phase, is indicated by $T_2$ to $T_4$. Once the viscosity of the medium reaches about 5,000 centipoises, it essentially ceases to be flowable. Pressure can be applied at this point or anywhere within the viscosity region of up to about 50,000 centipoises. The viscosity region where pressure can be applied as indicated by $V_2$ to $V_3$ and the corresponding time period is indicated by $T_3$ to $T_4$. The pressure can be applied nearly instantaneously, or if preferred, gradually in keeping with the rise in slope of the viscosity build-up curve. Since specific resin-forming compositions have their individual gelation characteristics, the viscosity increase curve of a particular composition can be expected to vary from that represented by the curve of FIG. 1 and the instant at which pressure will be applied to the composition will differ accordingly. Pressures on the order of from about 150 to about 4,000 p.s.i.a. are generally effective in dissolving or retaining in solution air or other gas(es) within the reaction media. Within the viscosity range of from above about 5,000 to about 50,000 centipoises, such pressures will not be so high as to force reaction media through the mold vents.

Figure 2:
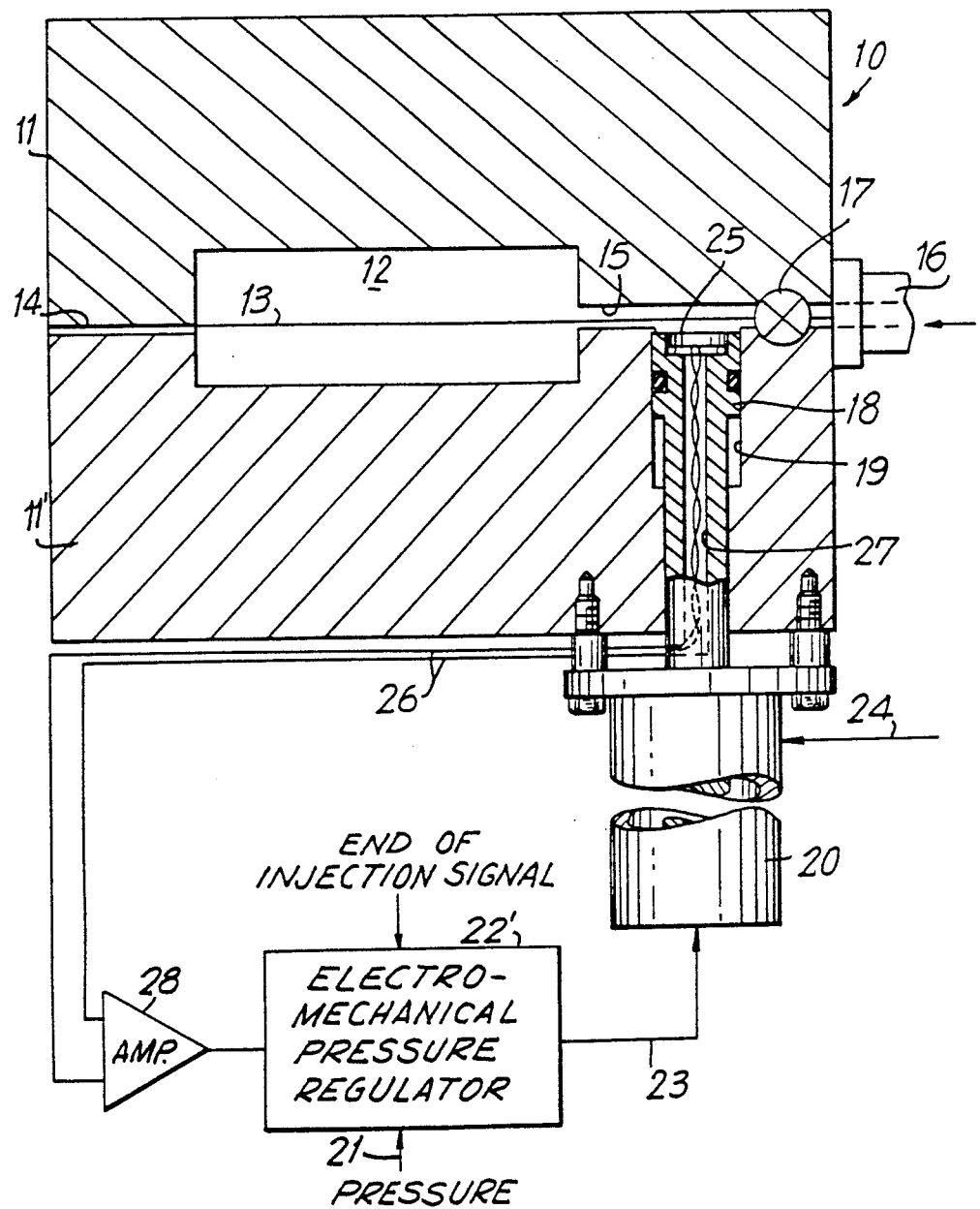
FIG. 2 illustrates an embodiment of the reaction injection molding apparatus of the present invention wherein hydraulic pressure transducer means are provided for continuously monitoring the change in viscosity of flowable thermosetting polyurethane elastomer-forming composition contained in the mold cavity and the pressure imparting means operates in conjunction with the viscosity monitoring means; and, FIGS. 3A–C illustrate another embodiment of the present invention wherein the increase in viscosity of the polymerizing resin-forming composition within the mold cavity is continuously monitored employing one or more transducers which impart shear wave energy, longitudinal wave energy or both to the contents of the mold cavity, the indication of fluid viscosity being utilized by a microprocessor-controlled unit to regulate the timing, magnitude and duration of pressure applied to the mold contents employing a movable mold wall section as a pressure-applying piston.

In FIG. 2, mold 10 comprises mold sections 11 and 11' which, in the closed position shown, cooperate to define a cavity 12 conforming to the exterior surfaces of the article to be molded. One or more gas-venting grooves 14 are provided along parting line 13 of the mold extending from the lip of cavity 12 to the outer edge of the mold. Mold 10 can, of course, possess one or more other features not shown such as mold sealing means, heating and/or cooling means, etc. A flowable polyurethane elastomer-forming composition comprising polyisocyanate, polyol, chain extender and catalyst is injected from the delivery end 16 of a mixing, metering and injection unit. A signal indicating the end of the injection cycle causes valve 17 to close thereby sealing runner 15. That section of runner 15 which is adjacent piston 18 will normally present an area which corresponds to that of the face of the piston. Piston 18 will, of course, be capable of traveling a sufficient distance to impart the operating pressures required. The pressure imparting means comprises piston 18 working in cylinder 19 by means of double-action hydraulic unit 20. As is apparent, piston 18 can be worked by a purely mechanical action as distinguished from the hydraulic action shown. While piston 18 and cylinder 19 are shown as integral elements of mold section 11', it is within the scope of this invention to provide the aforesaid elements as a separate unit which can be removably attached to the mold. As will be appreciated by those skilled in the art, pressure imparting means other than a mechanically or hydraulically actuated cylinder can also be used. Thus, e.g., the pressure imparting means can be provided as a pneumatically expandable bladder forming part of the mold cavity, an arrangement which is especially useful in reaction injection molds intended for the manufacture of pneumatic tires.

Dynamic pressure feedback sensing means are provided in the form of a hydraulic pressure transducer 25 embedded in piston 18. The hydraulic pressure, or resistive force, sensed by transducer 25 as piston 18 is advanced upwardly a short distance toward generates a current conveyed through electrical leads 26 which extend from piston core 27 to amplifier 28. The amplified current is related to the fluid viscosity of the polymerizing reaction medium and can therefore be used to control a conventional electromechanical pressure regulator unit 22' which is activated upon receiving a signal from the mixing, metering and injection unit indicating the end of the injection cycle or from valve 17 indicating the closing thereof. Electromechanical pressure regulator unit 22' utilizes the viscosity indication provided by transducer element 25 to regulate the pressure of the hydraulic fluid fed from line 21 to line 23. The hydraulic fluid thereafter enters double-acting hydraulic unit 20 thus controlling the movement of piston 18 and the amount of pressure imparted to the resin-forming composition. Hydraulic fluid reset line 24 restores piston 18 to its original position for successive molding cycles.

In operation, a precisely metered amount of flowable polyurethane elastomer-forming composition is injected from delivery end 16 of a conventional mixing, metering and injection unit into cavity 12 of the closed mold 10. When the mold cavity has been filled with the required charge, a signal from the mixing, metering and injection unit causes valve 17 to close thereby sealing runner 15. A signal, indicating the end of the injection cycle or the sealing of the mold, activates electromechanical pressure regulator unit 22' which in turn activates and regulates the pressure imparting means, i.e., piston 18. When relatively little resistance is offered against the movement of piston 18, the piston is immediately, but only very briefly, deactivated. As the resin-forming composition increases in viscosity (a function of its level of polymerization), it offers a correspondingly greater resistance to the movement of the reactivated piston. This greater resistance, or pressure feedback, will be converted by transducer 25 into an electric current whose magnitude is directly proportionate to the feedback pressure. The current is relayed to current amplifier 28 and thereafter to electromechanical pressure regulator 22'. In this manner, the viscosity build-up of the resin-forming composition can be constantly monitored in situ. When the viscosity has reached the preselected level, electromechanical pressure regulator 22' can be programmed to provide a relatively sudden increase in pressure or, alternatively, to provide a gradual or step-wise increase in the level of applied pressure. The amount of increased pressure applied to the resin-forming composition and the duration of its application are sufficient to dissolve or retain in solution all or a substantial part of the air or other gas(es) within the partially polymerized resin-forming composition and/or to force the contents of the mold in intimate contact with the mold wall surfaces in order to compensate for any shrinkage which they may have undergone during polymerization.

Figure 3A:
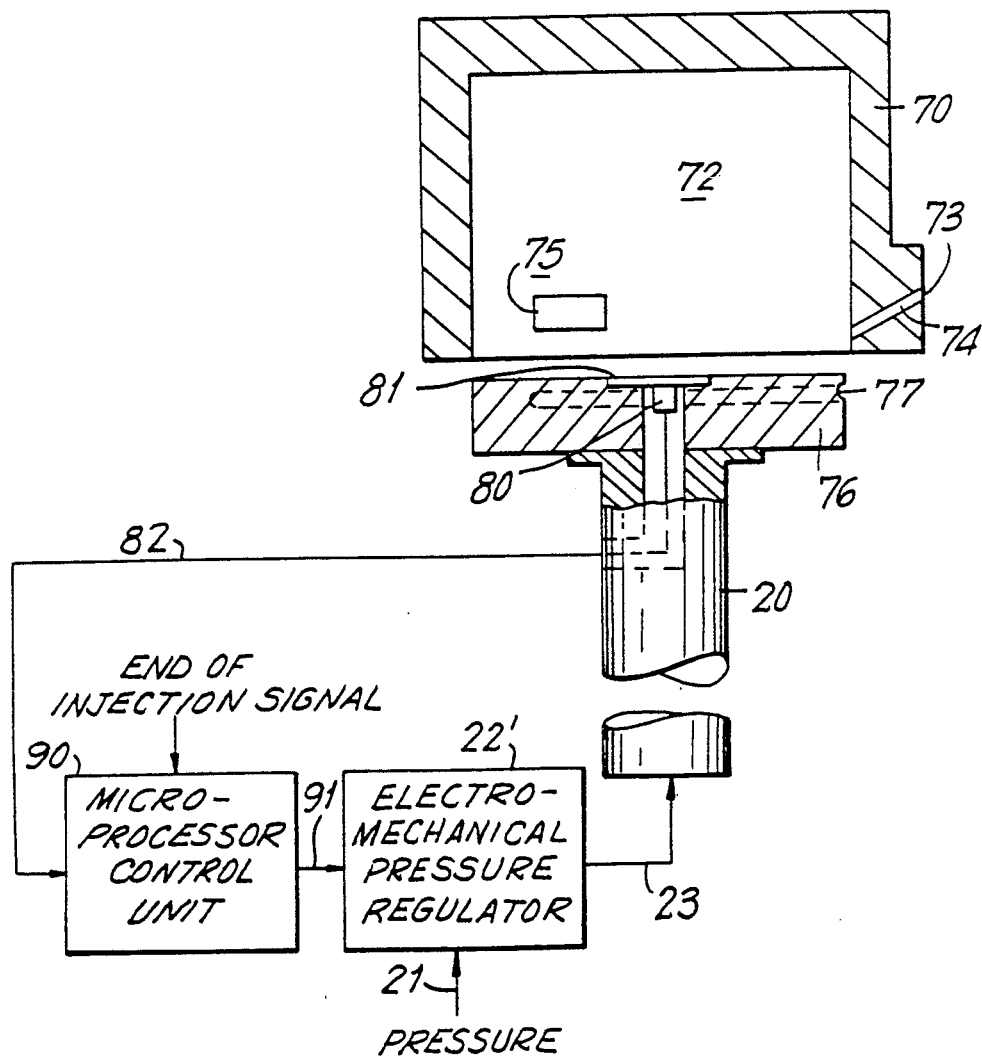
Figure 3B:
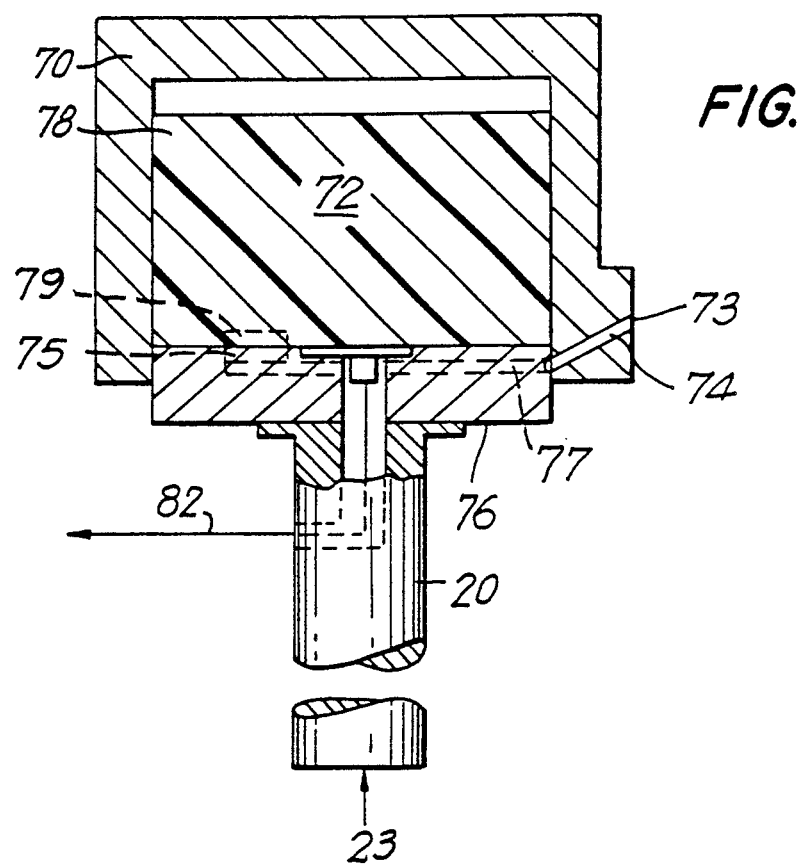
Figure 3C:
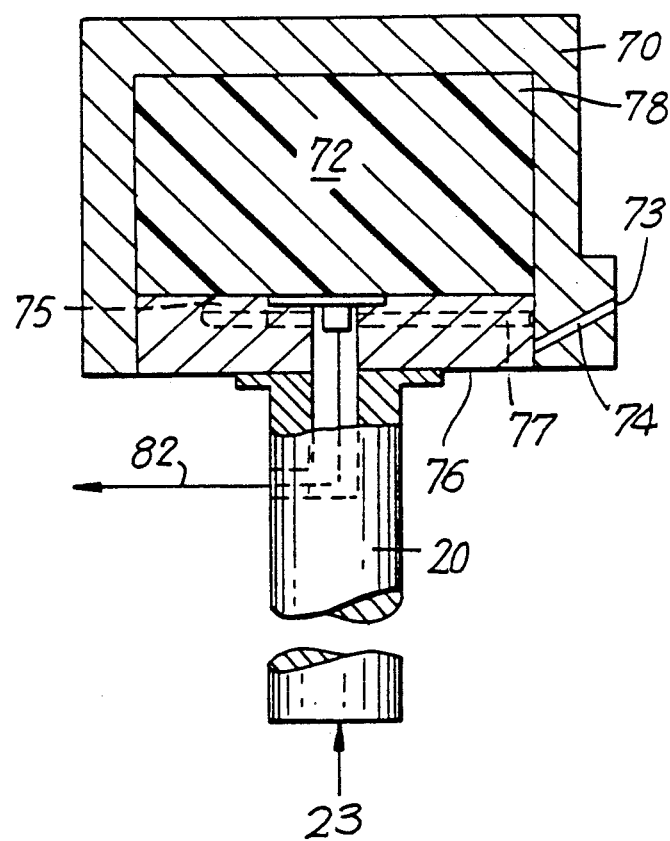

In the reaction injection mold illustrated in FIGS. 3A–C, mold half 70 (which cooperates with a like mold half, not shown, to provide a complete mold unit) possesses a cavity 72 and an upwardly movable rigid wall section in the form of a piston, or "bottom plate", 76. Dynamic fluid viscosity measurement means includes a piezoelectric transformer, shown generally at 80, which transforms electrical energy into acoustical vibratory energy which is imparted to said resin-forming composition and reconverts acoustical energy back to electrical energy. The fluid viscosity means can be operated substantially continuously or in pulses following the filling of the mold to provide substantially constant or rapidly sequenced measurement of the increases in viscosity taking place within the mold contents. In FIG. 3A, mold half 70 and bottom plate 76 are shown in exploded view to more clearly illustrate the operation of the mold, shown in FIG. 3B to be in the lower, or injection-cycle, position with the required charge of resin-forming composition 78 present within mold cavity 72 and shown in FIG. 3B to be in the upper, or curing-cycle, position with the resin-forming composition completely filling mold cavity 72.

Piezoelectric transformer 80 and its associated circuitry (not shown) are of a known type and are described in detail in U.S. Pat. No. 4,117,716, the contents of which are incorporated by reference herein. Connected to a suitable source of electrical current, piezoelectric transformer 80 serves to convert electrical energy to an acoustical wave which is transferred through compliant insulating membrane 81 to the contents of the mold cavity once the injection cycle has ended and bottom plate 76 has moved into its upper position as shown in FIG. 3C. Resin-forming composition 78 responds to the acoustical wave imparted to it by piezoelectric transformer 80 by producing a longitudinal acoustic impedance the magnitude of which is directly related to the viscosity of the polymerizing composition. This acoustic impedance is expressed as an output voltage and is received through electrical connector 82 by microprocessor control unit 90 which provides an output control signal 91 controlling the operation of electromechanical pressure regulator 22 much as described in the mold apparatus shown in FIG. 2 except that bottom plate 76 serves as the piston which applies the predetermined amount of pressure against the contents of the mold cavity. As will be recognized by those skilled in the art, other viscosity measuring means can be utilized in the practice of this invention, e.g., that shown in U.S. Pat. No. 4,754,640, the contents of which are incorporated by reference herein.

Referring again to FIG. 3A, injection port 73 receives the liquid resin-forming composition, e.g., a thermosetting polyurethane elastomer-forming composition as previously described, which travels via injection channel 74 into mold cavity 72. A gate 75 is defined within the wall of the mold and is positioned proximate to the geometric center of bottom plate 76 when the latter is in the injection cycle position as shown in FIG. 3B. Bottom plate 76 possesses an injection channel 77 defined along a section of the wall thereof and is moved upwardly within the mold by a hydraulic or mechanical actuated piston 20 upon completion of the injection cycle. It is to be understood that channel 77 can alternatively be defined within the wall of the mold cavity or within both the wall of the mold cavity and the wall of the bottom plate.

In FIG. 3B, bottom plate 76 is shown in the injection cycle position. Flowable resin-forming composition 78 enters injection port 73 and proceeds along the length of injection channels 74 and 77 to gate 75. Reaction mixture 78 enters the mold through open portion 79 of gate 75. Normally, an upper portion of mold cavity 72 remains empty at the conclusion of the injection cycle.

In FIG. 3C, bottom plate 76 is in the curing position, having been moved upwardly in the mold by double-action hydraulic unit 20. In moving upwardly, the bottom plate forces the resin-forming composition into the upper portion of the mold cavity to completely fill the cavity and at the same time seal gate 75 thereby preventing the introduction of any additional reaction mixture into the mold and any loss of reaction mixture from the mold. When the bottom plate has completed its full upward travel, a signal indicating the end of the injection cycle (and commencement of the curing cycle) is received by microprocessor control unit 90 which then begins its function of processing the viscosity-related voltage output produced by piezoelectric generator 80 to control the operation of hydraulic unit 20. The minimum distance through which the bottom plate must travel to seal the mold and generate said end-of-injection cycle signal will correspond to that required to completely seal injection channel 74 and/or gate 75.

While the reaction injection molding apparatus and process of this invention have been specifically illustrated for application to a flowable polyurethane elastomer-forming composition, it is to be understood that other flowable polymerizable resin-forming compositions can be processed into shaped articles in accordance with this invention.

What is claimed is:

1. Reaction injection molding apparatus which comprises:
   (a) a sealable mold possessing a cavity, the cavity-defining surface of which conforms to the external surface of the article to be molded;
   (b) means for introducing a metered amount of flowable polymerizable resin-forming composition into the cavity of the sealed mold;
   (c) means for venting the cavity of the sealed mold of gas displaced by resin-forming composition introduced into the cavity;
   (d) viscosity measuring means associated with the mold cavity for measuring increases in the viscosity of the resin-forming composition undergoing polymerization therein; and,
   (e) pressure imparting means positioned within the mold and operable only after the filling of the mold cavity, the pressure imparting means imparting a predetermined increased amount of pressure to resin-forming composition, said pressure being applicable to the composition only after it has attained a predetermined increased level of viscosity resulting from polymerization of polymerizable components therein as measured by the viscosity measuring means the pressure imparting means being responsive to the viscosity measuring means.

2. The apparatus of claim 1 wherein the pressure imparting means comprises a mechanically or hydraulically actuated piston.

3. The apparatus of claim 1 wherein the pressure imparting means comprises a pneumatically expandable bladder, the surface of the bladder constituting part of the cavity-defining surface.

4. The apparatus of claim 1 wherein the viscosity measuring means includes means for synchronal movement of the pressure.

5. The apparatus of claim 4 wherein the viscosity measuring means comprises a pressure transducer electrically connected to means for regulating the movement of a pressure-imparting piston.

6. The apparatus of claim 4 wherein the viscosity measuring means comprises one or more transducers for imparting acoustical energy to the contents of the mold cavity and generating an output voltage related to the fluid viscosity of said contents, said output voltage being utilized by means for regulating the movement of a pressure-imparting piston.

7. The apparatus of claim 6 wherein the transducer is connected to an electromechanical hydraulic fluid pressure regulator which regulates the movement of the piston.

8. The apparatus of claim 2 wherein the face of the piston constitutes part of the cavity-defining surface.

9. The apparatus of claim 2 wherein the face of the piston does not constitute any part of the mold cavity surfaces but is positioned to operate against resin-forming composition present in a passage through which the composition is introduced into the mold cavity.

10. The apparatus of claim 8 wherein the means for introducing resin-forming composition into the cavity of the sealed mold comprises at least one passage extending from an injection port and terminating in at least one gate positioned within the mold cavity at a point relatively proximate to the geometric center or point of balance of the piston, the passage being defined within the wall of the mold cavity at a level below the face of the piston when the piston is in position for the commencement of the injection cycle with the piston wall serving as one wall of the passage, with the flow of resin-forming composition through the gate during the injection cycle being uninterrupted when the piston is in position for the commencement of the injection cycle and interrupted when the piston is moved to a different position at the conclusion of the injection cycle.

* * * * *